US012631518B2

(12) United States Patent
Chang et al.

(10) Patent No.: US 12,631,518 B2
(45) Date of Patent: May 19, 2026

(54) ARRAY LENS MODULE CALIBRATION EQUIPMENT AND CALIBRATION METHOD THEREOF

(71) Applicant: Industrial Technology Research Institute, Hsinchu (TW)

(72) Inventors: Chia-Jung Chang, Yunlin County (TW); Chang Huang, New Taipei City (TW); Hsing-Wei Huang, Hsinchu City (TW); Ying-Hao Wang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 172 days.

(21) Appl. No.: 18/391,629

(22) Filed: Dec. 20, 2023

(65) Prior Publication Data

US 2024/0310241 A1     Sep. 19, 2024

Related U.S. Application Data

(60) Provisional application No. 63/452,701, filed on Mar. 17, 2023.

(30) Foreign Application Priority Data

Nov. 7, 2023     (TW) .................................. 112142751

(51) Int. Cl.
*G01M 11/02*          (2006.01)
*G02B 3/00*           (2006.01)

(52) U.S. Cl.
CPC ....... *G01M 11/0257* (2013.01); *G02B 3/0012* (2013.01)

(58) Field of Classification Search
CPC .......... G01M 11/0257; G01M 11/0221; G02B 3/0012; G02B 7/003; G02B 7/023;
(Continued)

(56) References Cited

U.S. PATENT DOCUMENTS

| 6,124,974 A | 9/2000 | Burger |
| 6,381,072 B1 | 4/2002 | Burger |
| (Continued) | | |

FOREIGN PATENT DOCUMENTS

| CN | 100483157 | 4/2009 |
| CN | 102608728 | 11/2013 |
| (Continued) | | |

OTHER PUBLICATIONS

Luo et al., "Visual positioning method based on line laser 3D measurement system", 2021.*
(Continued)

*Primary Examiner* — John L Goff, II
(74) *Attorney, Agent, or Firm* — JCIPRNET

(57) ABSTRACT

An array lens module calibration equipment includes a carrying platform, a visual positioning module, a laser alignment module, a depth-of-field measurement module, and a coplanarity adjustment module. An array lens module has an optical axis and includes a substrate, a calibration via through the substrate, a plurality of lens frames, and a plurality of lens sets. The visual positioning module is configured to provide a visual positioning beam and capture an image of an appearance to obtain appearance information. The laser alignment module is configured to provide a calibration laser beam so as to obtain alignment information. The depth-of-field measurement module is configured to capture a depth-of-field image to obtain depth-of-field information. The coplanarity adjustment module is configured to adjust relative positions of the plurality of lens frames relative to the substrate in an optical axis direction based on the appearance information, the alignment information, and the depth-of-field information.

15 Claims, 3 Drawing Sheets

(58) Field of Classification Search
CPC .... G02B 7/025; G02B 7/021; B29C 65/7802;
B29C 66/52291
USPC .................................. 156/64, 378, 379, 293
See application file for complete search history.

(56) References Cited

U.S. PATENT DOCUMENTS

| | | | |
|---|---|---|---|
| 6,611,380 | B2 | 8/2003 | Kowarz et al. |
| 9,201,241 | B2 | 12/2015 | Jayapala et al. |
| 9,516,222 | B2 | 12/2016 | Duparre et al. |
| 11,328,380 | B2 | 5/2022 | Pinter et al. |
| 2014/0326855 | A1 | 11/2014 | Lu et al. |
| 2020/0249455 | A1 | 8/2020 | Chan |
| 2022/0390732 | A1 | 12/2022 | Mueller-Rentz et al. |

FOREIGN PATENT DOCUMENTS

| | | | | |
|---|---|---|---|---|
| CN | 103140339 | 11/2015 | | |
| CN | 105379245 | 8/2018 | | |
| CN | 105681637 | 12/2019 | | |
| CN | 211786301 | 10/2020 | | |
| CN | 114114705 | 3/2022 | | |
| CN | 116520523 A | * | 8/2023 | ............. G02B 7/025 |
| TW | M552720 | 12/2017 | | |
| TW | I630432 | 7/2018 | | |

OTHER PUBLICATIONS

"Office Action of Taiwan Counterpart Application", issued on Feb. 4, 2025, p. 1-p. 3.

"Office Action of Taiwan Related Application, Application No. 112139742", issued on Feb. 4, 2025, p. 1-p. 4.

C. Gorecki et al., "Micromachined phase-shifted array-type Mirau interferometer for swept-source OCT imaging: design, microfabrication and experimental validation", Biomedical Optics Express, vol. 10, Feb. 2019, pp. 1111-1125.

O G Karhade et al., "SOI-based micro scanning grating interferometers: device characterization, control and demonstration of parallel operation", Journal of Micromechanics and Microengineering, vol. 18, Feb. 2008, pp. 1-4.

Peter J. De Groot et al., "Interference microscope objectives for wide-field areal surface topography measurements", Optical Engineering, vol. 55, Jul. 2016, pp. 1-7.

Abraham P. Lee et al., "Vertical-actuated electrostatic comb drive with in situ capacitive position correction for application in phase shifting diffraction interferometry", Journal of Microelectromechanical Systems, vol. 12, Dec. 2003, pp. 960-971.

Li Fan et al., "High-resolution 3D OCT imaging with a MEMS scanning endoscope", SPIE MOEMS-MEMS, vol. 5719, Jan. 2005, pp. 1-5.

"Office Action of U.S. Appl. No. 18/544,446", issued on Feb. 25, 2026, pp. 1-20.

* cited by examiner

ARRAY LENS MODULE CALIBRATION EQUIPMENT AND CALIBRATION METHOD THEREOF

CROSS-REFERENCE TO RELATED APPLICATION

This application claims the priority benefit of U.S. provisional application Ser. No. 63/452,701, filed on Mar. 17, 2023, and Taiwan application serial no. 112142751, filed on Nov. 7, 2023. The entirety of each of the above-mentioned patent applications is hereby incorporated by reference herein and made a part of this specification.

TECHNICAL FIELD

The disclosure relates to an optical calibration equipment, and relates to an array lens module calibration equipment and a calibration method thereof.

BACKGROUND

In the future market demand, with the widespread application of advanced packaging chips, High Performance Computing (HPC) chip will gradually become the mainstream of the market. HPC Chips usually need to integrate multiple computing units such as High Bandwidth Memory (HBM) and other chiplets, so it will be integrated into a large chip in size. Traditional detection method will be limited to the detection speed and cannot be used for this detection. Therefore, providing fast and accurate 3D shape detection equipment is in strong demand.

Currently, the detection technique of white light interference can reach nanometer-level precision, but the detection speed of known white light interference equipment is very limited. In a solution that uses multiple lens for detection, it always needs multiple additional components to be equipped for scanning, so that construction cost of the whole equipment is quite high. In addition, for implementing simultaneous scanning, the coplanarity of each elements in the multi-lens structure must be consistent to make the white light coherence length less than or equal to 10 μm and meet specification. However, the insufficient processing precision of the existing optical clamping mechanism causes the coplanarity of the lens elements is far greater than 10 μm, so simultaneous scanning cannot be implemented to expand the field of view by using array lens for speeding up online detection.

SUMMARY

The disclosure provides an array lens module calibration equipment, which includes a carrying platform, a visual positioning module, a laser alignment module, a depth-of-field measurement module, and a coplanarity adjustment module. The carrying platform is configured to carry an array lens module. The array lens module has an optical axis and includes a substrate, a calibration via through the substrate, a plurality of lens frames disposed on the substrate, and a plurality of lens sets respectively disposed in the plurality of lens frames. The visual positioning module is configured to provide a visual positioning beam to the array lens module, and capture an image of an appearance of the array lens module to obtain appearance information of the array lens module. The laser alignment module is configured to provide a calibration laser beam which is imaged after passing through the calibration via and the plurality of lens sets so as to obtain alignment information. The depth-of-field measurement module is configured to capture a depth-of-field image of the plurality of lens sets to obtain depth-of-field information of the plurality of lens sets. The coplanarity adjustment module is configured to adjust relative positions of the plurality of lens frames relative to the substrate in an optical axis direction parallel to the optical axis based on the appearance information, the alignment information, and the depth-of-field information.

The disclosure also provides a calibration method of an array lens module calibration equipment, which includes the following steps. An array lens module calibration equipment is provided, wherein the array lens module calibration equipment includes a carrying platform, a visual positioning module, a laser alignment module, a depth-of-field measurement module, and coplanarity adjustment module. An array lens module is provided to the carrying platform, wherein the array lens module includes a substrate, a plurality of lens frames disposed on the substrate, and a plurality of lens sets respectively disposed in the plurality of lens frames. Glue is provided between the substrate and the plurality of lens frames. A visual positioning beam is provided to the array lens module, and an image of an appearance of the array lens module is captured to obtain appearance information. A calibration laser beam which is imaged after passing through a calibration via and the plurality of lens sets of the array lens module is provided so as to obtain alignment information. A depth-of-field image of the plurality of lens sets is captured to obtain depth-of-field information. Relative positions of the plurality of lens frames and the substrate are adjusted in an optical axis direction parallel to an optical axis based on the appearance information, the alignment information, and the depth-of-field information. The glue is cured to fix positions of the plurality of lens frames on the substrate.

In order to make the above-mentioned features and advantages of the disclosure clearer and easier to understand, the following embodiments are given and described in details with accompanying drawings as follows.

DETAILED DESCRIPTION OF DISCLOSED EMBODIMENTS

Figure 1:
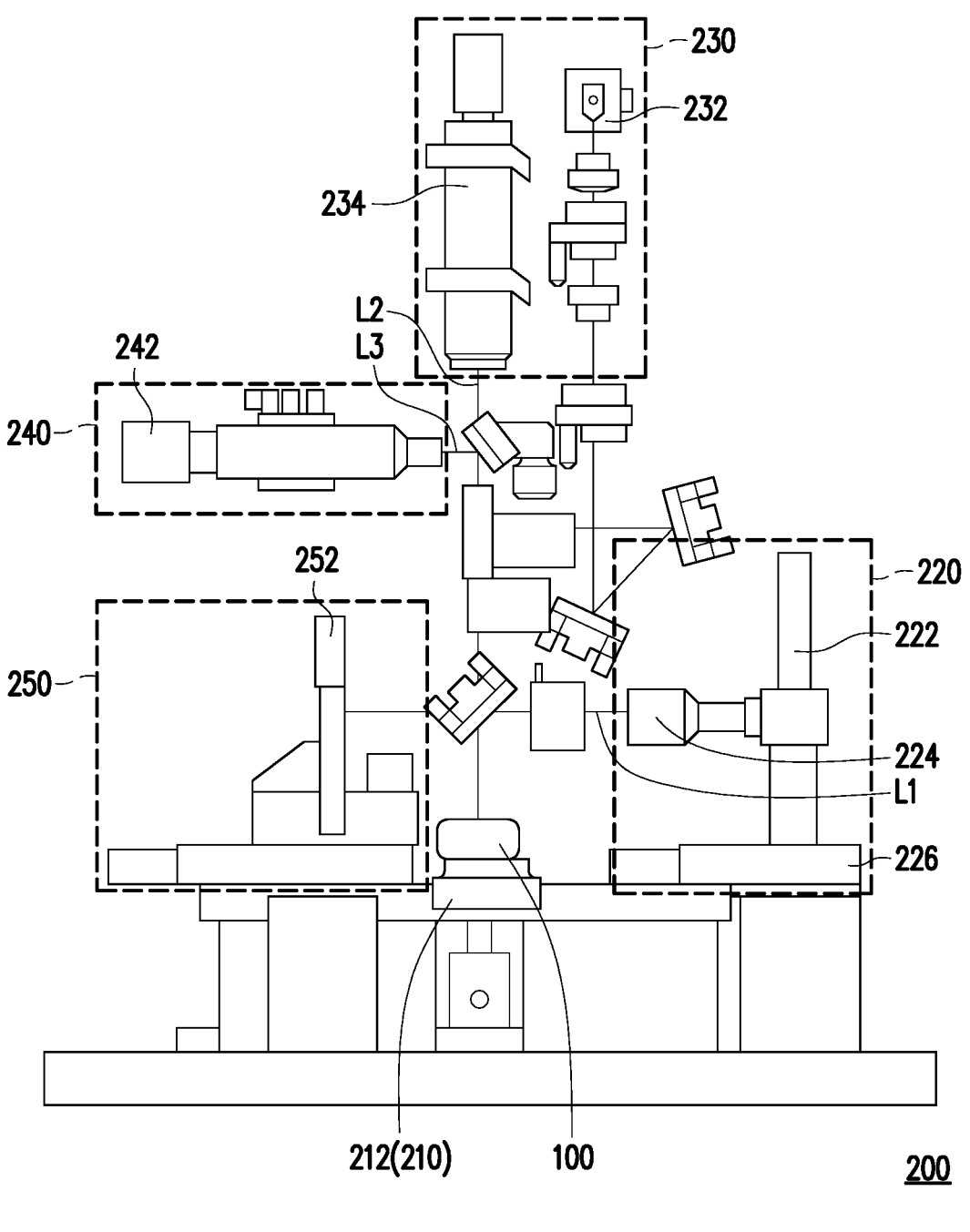
FIG. 1 is a schematic diagram of an array lens module calibration equipment according to an embodiment of the disclosure.

FIG. 1 is a schematic diagram of an array lens module calibration equipment according to an embodiment of the disclosure. The embodiment proposes an array lens module calibration equipment 200, which includes a carrying platform 210, a visual positioning module 220, a laser alignment module 230, a depth-of-field measurement module 240, and a coplanarity adjustment module 250. The array lens module calibration equipment 200 is configured to calibrate an array lens module 100, so that the array lens module 100 can be applied in an optical interference microscope system, such as a white light interference microscope. The principle of light interference is configured to display the surface or internal structure of the to-be-measured component, which can be applied to fast and accurate three-dimensional measurement.

The carrying platform 210 is configured to carry the array lens module 100. In the embodiment, the carrying platform 210 includes a clamp 212 for clamping and fixing the array lens module 100.

Figure 2:
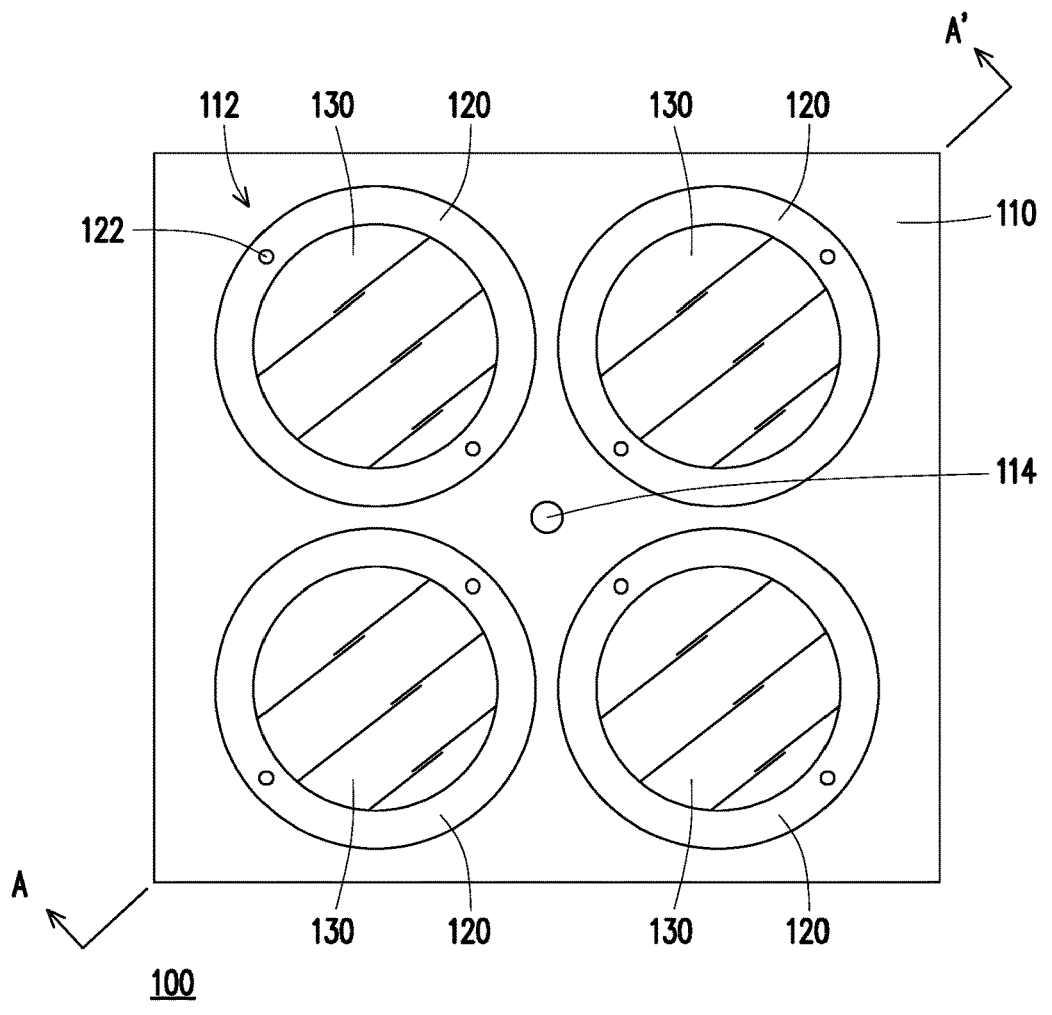
FIG. 2 is a schematic top view of an array lens module according to an embodiment of the disclosure.
Figure 3:
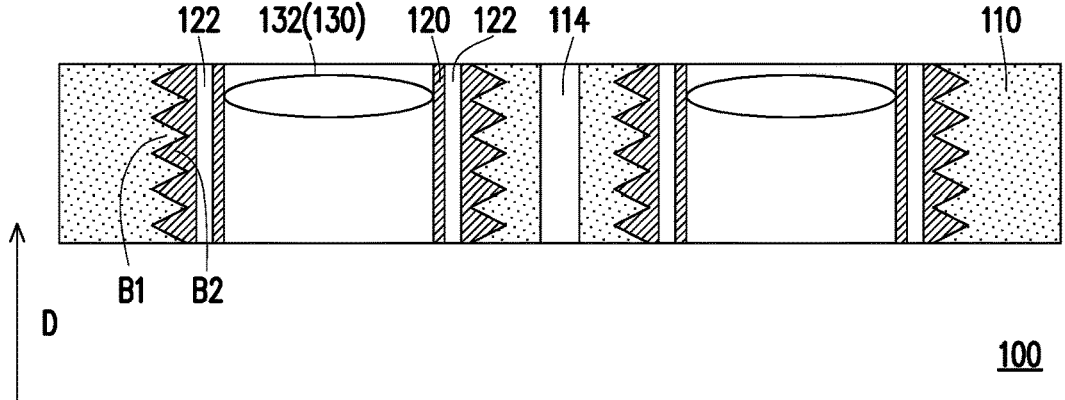
FIG. 3 is a schematic cross-sectional view of the array lens module of FIG. 2 along line AA'.

FIG. 2 is a schematic top view of an array lens module according to an embodiment of the disclosure. FIG. 3 is a schematic cross-sectional view of the array lens module of FIG. 2 along line AA'. Please refer to FIG. 2 and FIG. 3. In the embodiment, the array lens module 100 has an optical axis and includes a substrate 110, a plurality of lens frames 120 disposed in the substrate 110, and a plurality of lens sets 130 respectively disposed in the plurality of lens frames 120. For example, the substrate 110 includes a plurality of accommodating vias 112 and a calibration via 114, and the calibration via 114 is located at the symmetric center among the plurality of lens frames 120. The plurality of lens frames 120 are respectively disposed in the plurality of accommodating vias 112, and each lens frame 120 includes at least one adjustment hole 122 respectively located around the plurality of lens sets 130. The plurality of lens sets 130 are respectively disposed in the plurality of lens frames 120, and each lens group 130 includes at least one lens 132. Each accommodating via 112 includes an internal thread structure B1, and each lens frame 120 includes an external thread structure B2. The internal thread structure B1 and the external thread structure B2 are adapted to each other.

Please continue to refer to FIG. 1. The visual positioning module 220 is configured to provide a visual positioning beam L1 to the array lens module 100, and capture an image of the array lens module 100 to obtain appearance information. In the embodiment, the appearance information includes, for example, the positions of each lens frame 120, the adjustment hole 122, the calibration via 114, and other structures of the array lens module 100. In detail, the visual positioning module 220 includes a coaxial light source 222, a telecentric lens 224, and a visual positioning beam receiver 226. The coaxial light source 222 is configured to provide the visual positioning beam L1 to the array lens module 100. The telecentric lens 224 is disposed between the visual positioning beam receiver 226 and the array lens module 100. When the visual positioning module 220 captures the image of the array lens module 100, the visual positioning beam receiver 226 is configured to receive the visual positioning beam L1 from the array lens module 100 to obtain the appearance information, and thereby adjust and converge imaging of different lens sets 130 on the imaging plane into one point. In this way, the location of the structure of the array lens module 100 can be obtained through the visual positioning module 220, so that other components can accurately adjust and calibrate the lens set 130 of the array lens module 100 respectively.

The laser alignment module 230 is configured to provide a calibration laser beam L2 which is imaged after passing through the calibration via 114 and the plurality of lens sets 130 of the array lens module 100 so as to obtain alignment information. In the embodiment, the alignment information is, for example, the spot position of the calibration laser beam L2 after passing through the array lens module 100. Specifically, the laser alignment module 230 includes an off-axis laser light source 232 and a laser alignment beam receiver 234, and there is a reflection plane (not shown), for example, disposed on a side of the array lens module 100 away from the laser alignment module 230, and configured to reflect the beam back to the laser alignment module 230, so that the beam can be imaged, but the disclosure is not limited thereto. The reflection plane is, for example, a reflection structure inside each lens set 130 or an additional reflection element disposed externally, and the disclosure is not limited thereto. The off-axis laser light source 232 is configured to provide the calibration laser beam L2 to transmit and pass through the calibration via 114 and the plurality of lens sets 130 of the array lens module 100. The calibration laser beam L2 is a parallel beam parallel to the optical axis, and the calibration laser beam L2 is an off-axis laser beam. After transmitting downward and passing through the calibration via 114 and the plurality of lens sets 130, the calibration laser beam L2 will be reflected by the reflection plane of and then transmit upward, and the laser alignment beam receiver 234 is configured to receive the calibration laser beam L2 passed through the array lens module 100 for imaging so as to obtain the alignment information. Since the calibration via 114 is located at the symmetric center among the plurality of lens frames 120, the imaging position on the laser alignment beam receiver 234 by the calibration laser beam L2 after passing through the calibration via 114 and being reflected by the reflection plane is defined as the zero point. By calculating the distance between the zero point position and the imaging positions on the laser alignment beam receiver 234 by the calibration laser beam L2 after passing through the lens set 130 and being reflected by the reflection plane, the focus point position of each lens set 130 can be calculated. In this way, the distance of the spot position reflected back after the calibration laser beam L2 is provided by the laser alignment module 230 to pass through the array lens module 100 can be used to optically calibrated the array lens module 100. For example, each lens set 130 is adjusted, so that the imaging of the reflected calibration laser beam L2 passed through lens sets 130 and the calibration via 114 overlap into one point to complete the calibration, and the coplanarity of the plurality of lens sets 130 in the array lens module 100 can be improved.

The depth-of-field measurement module 240 is configured to capture a depth-of-field image of the plurality of lens sets 130 to obtain depth-of-field information. In the embodiment, the depth-of-field information is, for example, the depth-of-field range of each lens set 130 in the array lens module 100. In detail, the depth-of-field measurement module 240 includes an array light source 242 and a depth-of-field image capturing element (not shown). The array light source 242 is configured to provide a depth-of-field measurement beam L3 to transmit and pass through the plurality of lens sets 130 of the array lens module 100. The depth-of-field image capturing element is configured to receive the depth-of-field measurement beam L3 from the array lens module 100, and thereby obtain the depth-of-field information of each lens set 130 in the array lens module 100. For example, a reference optical element with a specific pattern can be configured in each lens set 130, so that the above-mentioned specific pattern is displayed when the depth-of-field image capturing element of the depth-of-field measurement module 240 captures an image of each lens set 130, and the depth-of-field position can be accordingly determined by the clarity of the pattern. In this way, the depth-of-field measurement beam L3 can be provided by the depth-of-field measurement module 240 to measure the depth-of-field range of each lens set 130 in the array lens module 100, and then the array lens module 100 can be optically calibrated, so that the clarity of each lens set 130 remains consistent to improve the coplanarity of the plurality of lens sets 130 in the array lens module 100. However, in another embodiment, the above-mentioned reference optical element with a specific pattern can be independently provided outside the lens sets 130, and under this configuration, the above-mentioned specific pattern can also be displayed in the same way when the depth-of-field image capturing element of the depth-of-field measurement module 240 captures an image of each lens set 130 to determine the depth-of-field position, so the reference optical element with the specific pattern is not limited to being provided in each lens set.

The coplanarity adjustment module 250 is configured to adjust the relative positions of the plurality of lens frames 120 and the substrate 110 in an optical axis direction D based on the appearance information, the alignment information, and the depth-of-field information. In the embodiment, the coplanarity adjustment module 250 includes at least one robot arm 252 configured to adjust the plurality of lens frames 120 of the array lens module 100. Specifically, in the embodiment, the robot arm 252 can adjust the array lens module 100 by using the adjustment hole 122 based on the appearance information, and then adjust the relative rotation angle of each lens frame 120 in the array lens module 100 by the internal thread structure B1 and the external thread structure B2 adapting to each other so as to change the position in the substrate 110 along the optical axis direction D parallel to the optical axis. In other words, the relative position of each lens frame 120 and the substrate 110 changes according to the rotation angles of the plurality of lens frames 120. It is worth mentioning that the aforementioned alignment information and depth-of-field information will be changed due to the adjustment of the coplanarity adjustment module 250. Therefore, the alignment information and the depth-of-field information can be repeatedly obtained according to different requirements, so that the coplanarity adjustment module 250 repeatedly adjusts the array lens module 100. In this way, the coplanarity of the plurality of lens sets 130 in the array lens module 100 can be ensured to meet the requirements. According to the design of the embodiment, the maximum distance difference between the respective focal planes of the plurality of lens sets 130 can be calibrated by the array lens module calibration equipment 200 to achieve a precision of less than or equal to 3 microns, so that compared with traditional technology, a better coplanarity and a favorable optical effect can be provided.

Figure 4:
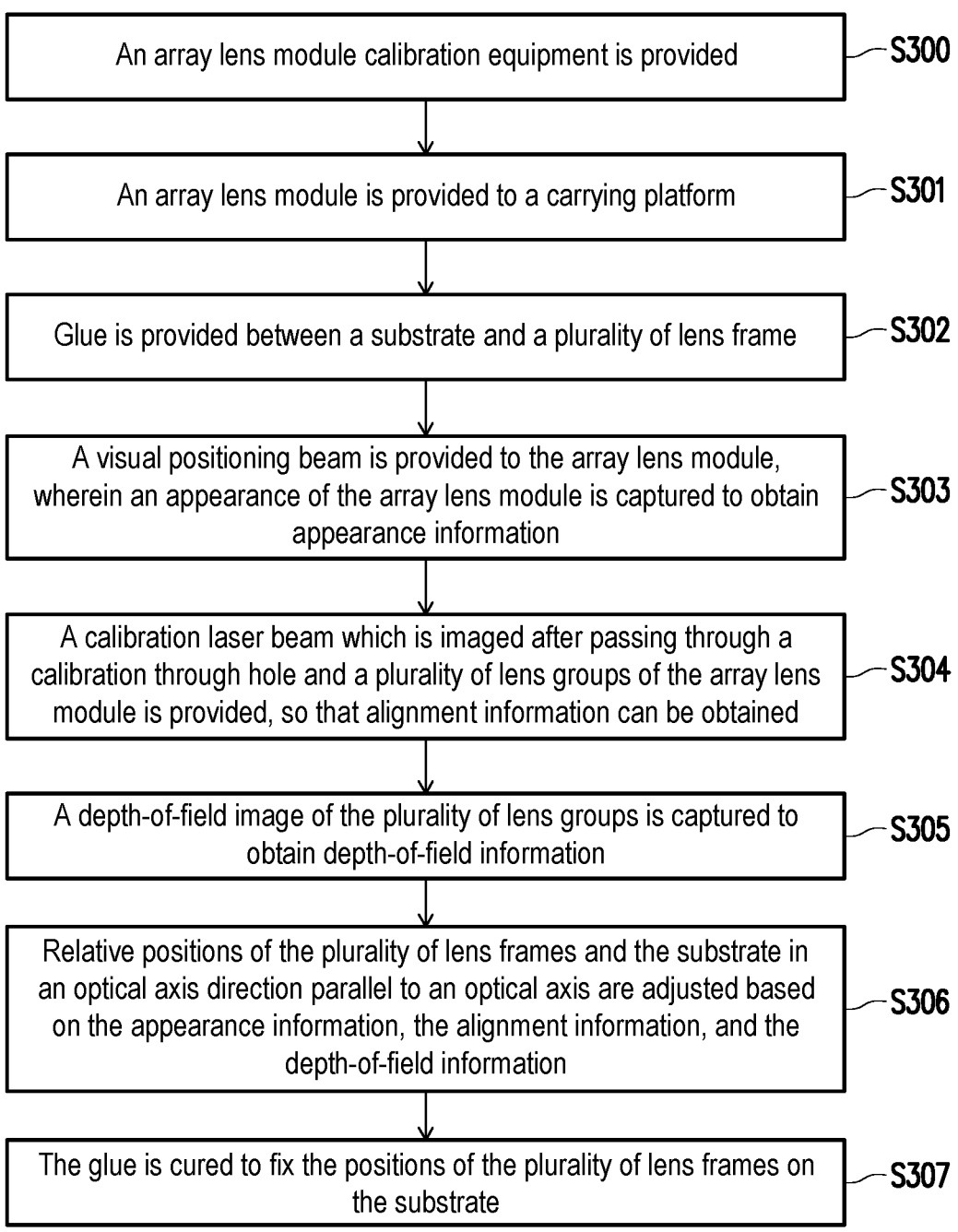
FIG. 4 is a step flow chart of a calibration method of an array lens module calibration equipment according to an embodiment of the disclosure.

FIG. 4 is a step flow chart of a calibration method of an array lens module calibration equipment according to an embodiment of the disclosure. Please refer to FIG. 1, FIG. 3, and FIG. 4. The embodiment provides a calibration method of the array lens module calibration equipment 200, which can be applied at least to the array lens module calibration equipment 200 and the array lens module 100 of FIG. 1 and FIG. 2, and is illustrated as an example in the subsequent paragraphs. In the embodiment, first, step S300 is performed to provide the array lens module calibration equipment 200. The array lens module calibration equipment 200 includes the carrying platform 210, the visual positioning module 220, the laser alignment module 230, the depth-of-field measurement module 240, and the coplanarity adjustment module 250. Next, step S301 is performed to provide the array lens module 100 to the carrying platform 210. The array lens module 100 has an optical axis and includes the substrate 110, the plurality of lens frames 120 disposed on the substrate 110, and the plurality of lens sets 130 respectively disposed in the plurality of lens frames 120.

Next, step S302 is performed to provide glue between the substrate 110 and the plurality of lens frames 120. The glue is, for example, light-curing glue. After the glue is provided, the plurality of lens frames 120 can still be respectively rotated and calibrated on the substrate 110.

Next, step S303 is performed to provide the visual positioning beam L1 to the array lens module 100 and the appearance of the array lens module 100 is captured to obtain appearance information. Specifically, the visual positioning module 220 includes the coaxial light source 222, the telecentric lens 224, and the visual positioning beam receiver 226. The coaxial light source 222 is configured to provide the visual positioning beam L1 to the array lens module 100. The telecentric lens 224 is disposed between the visual positioning beam receiver 226 and the array lens module 100. The visual positioning beam receiver 226 is configured to receive the visual positioning beam L1 from the array lens module 100 to obtain the appearance information.

Next, step S304 is performed to provide the calibration laser beam L2 which is imaged after passing through the calibration via 114 and the plurality of lens sets 130 of the array lens module 100, so that alignment information can be obtained. Specifically, the laser alignment module 230 includes the off-axis laser light source 232 and the laser alignment beam receiver 234. The off-axis laser light source 232 is configured to provide the calibration laser beam L2 to transmit and pass through the calibration via 114 and the plurality of lens sets 130 of the array lens module 100. The calibration laser beam L2 is an off-axis laser beam. After passing through the calibration via 114 and the plurality of lens sets 130, the calibration laser beam L2 can be designed to be reflected by the reflection plane to the laser alignment beam receiver 234, and the laser alignment beam receiver 234 is configured to receive the calibration laser beam L2 from the array lens module 100 to perform imaging so as to obtain the alignment information.

Next, step S305 is performed to capture a depth-of-field image of the plurality of lens sets 130 to obtain depth-of-field information. Specifically, the depth-of-field measurement module 240 includes the array light source 242 and the depth-of-field image capturing element (not shown). The array light source 242 is configured to provide the depth-of-field measurement beam L3 to transmit and pass through the plurality of lens sets 130 of the array lens module 100. The depth-of-field image capturing element is configured to receive the depth-of-field measurement beam L3 from the array lens module 100, and thereby obtain the depth-of-field information of each lens set 130 in the array lens module 100.

Next, step S306 is executed to adjust the relative positions of the plurality of lens frames 120 and the substrate 110 in the optical axis direction D parallel to the optical axis based on the appearance information, the alignment information, and the depth-of-field information. Specifically, the robot arm 252 in the coplanarity adjustment module 250 is configured to adjust the adjustment hole 122 based on the appearance information, the alignment information, and the depth-of-field information, and adjust the rotation angle of each lens frame 120 in the array lens module 100 by the internal thread structure B1 and the external thread structure B2 being adapted to each other, thereby changing the position of each lens frame 120 in the substrate 110 along the optical axis direction D to complete the calibration of the array lens module 100.

Finally, step S307 is performed to cure the glue to fix the positions of the plurality of lens frames 120 on the substrate 110 so as to fix the positions of the plurality of lens sets 130 in the array lens module 100. In this way, the coplanarity of the plurality of lens sets 130 in the array lens module 100 can be ensured to meet the requirements, so that the maximum distance difference between the respective focal planes of the plurality of lens sets 130 can reach a precision of less than or equal to 3 microns.

It is worth mentioning that in the above steps, some steps can be further repeated to improve the calibration precision. For example, in the embodiment, the calibration laser beam L2 is repeatedly provided to the array lens module 100 to update the alignment information, and the depth-of-field measurement beam L3 is repeatedly provided to the array lens module 100 to obtain the depth-of-field information. Finally, the relative positions of the plurality of lens frames 120 and the substrate 110 in the optical axis direction D are adjusted based on the updated alignment information and depth-of-field information.

To sum up, in the array lens module calibration equipment and the calibration method thereof of the disclosure, the array lens module calibration equipment includes the carrying platform, the visual positioning module, the laser alignment module, and the depth-of-field measurement module, and the coplanarity adjustment module. The visual positioning module provides the visual positioning beam to the array lens module to obtain appearance information. The laser alignment module provides the calibration laser beam to the array lens module to obtain alignment information. The depth-of-field measurement module provides the depth-of-field measurement beam to the array lens module to obtain depth-of-field information. In this way, the location of different structures on the array lens module, the spot position reflected by the calibration laser beam, and the depth-of-field range of each lens group in the array lens module can be obtained based on the appearance information, the alignment information, and the depth-of-field information, and then an optical calibration can be performed on the array lens module to adjust the relative positions of the plurality of lens sets and the substrate in the optical axis direction in the array lens module, so that the coplanarity of the plurality of lens sets in the array lens module can be improved.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. An array lens module calibration equipment, comprising:

a carrying platform, configured to carry an array lens module, wherein the array lens module has an optical axis and comprises a substrate, a calibration via through the substrate, a plurality of lens frames disposed on the substrate, and a plurality of lens sets respectively disposed in the plurality of lens frames;

a visual positioning module, configured to provide a visual positioning beam to the array lens module, and capture an appearance of the array lens module to obtain appearance information of the array lens module;

a laser alignment module, configured to provide a calibration laser beam which is imaged after passing through the calibration via and the plurality of lens sets so as to obtain alignment information;

a depth-of-field measurement module, configured to capture a depth-of-field image of the plurality of lens sets to obtain depth-of-field information of the plurality of lens sets; and a coplanarity adjustment module, configured to adjust relative positions of the plurality of lens frames relative to the substrate in an optical axis direction parallel to the optical axis based on the appearance information, the alignment information, and the depth-of-field information.

2. The array lens module calibration equipment according to claim 1, wherein the carrying platform comprises a clamp, and the clamp is configured to clamp and fix the array lens module.

3. The array lens module calibration equipment according to claim 1, wherein the visual positioning module comprises a coaxial light source, a telecentric lens, and a visual positioning beam receiver, the coaxial light source provides the visual positioning beam, the telecentric lens is arranged between the visual positioning beam receiver and the array lens module, and the visual positioning beam receiver is configured to receive the visual positioning beam from the array lens module.

4. The array lens module calibration equipment according to claim 1, wherein the calibration laser beam is a parallel beam parallel to the optical axis.

5. The array lens module calibration equipment according to claim 4, wherein the laser alignment module comprises an off-axis laser light source and a laser alignment beam receiver, the off-axis laser light source is configured to provide the calibration laser beam to pass through the calibration via and the plurality of lens sets, and the laser alignment beam receiver is configured to receive the calibration laser beam from the array lens module.

6. The array lens module calibration equipment according to claim 1, wherein the calibration via is located at a symmetric center among the plurality of lens frames.

7. The array lens module calibration equipment according to claim 1, wherein the depth-of-field measurement module comprises an array light source and a depth-of-field image capturing element, the array light source is configured to provide a depth-of-field measurement beam to transmit to the plurality of lens sets of the array lens module, and the depth-of-field image capturing element is configured to receive the depth-of-field measurement beam from the array lens module to capture an image of the array lens module.

8. The array lens module calibration equipment according to claim 1, wherein the coplanarity adjustment module comprises at least one robot arm configured to adjust the plurality of lens frames of the array lens module based on the appearance information, the alignment information, and the depth-of-field information.

9. The array lens module calibration equipment according to claim 8, wherein the relative position of each of the plurality of lens frames relative to the substrate changes according to rotation angles of the plurality of lens frames.

10. A calibration method of an array lens module calibration equipment, comprising:

providing the array lens module calibration equipment according to claim 1;

arranging the array lens module on the carrying platform;

providing glue between the substrate and the plurality of lens frames;

transmitting the visual positioning beam to the array lens module, and capturing the appearance of the array lens module to obtain appearance information of the array lens module by the visual positioning module;

transmitting the calibration laser beam which is imaged after passing through the calibration via and the plurality of lens sets so as to obtain alignment information by the laser alignment module;

capturing the depth-of-field image of the plurality of lens sets to obtain depth-of-field information of the plurality of lens sets by the depth-of-field measurement module;

adjusting relative positions of the plurality of lens frames relative to the substrate in the optical axis direction parallel to the optical axis based on the appearance information, the alignment information, and the depth-of-field information by the coplanarity adjustment module; and curing the glue to fix positions of the plurality of lens frames on the substrate.

11. The calibration method of the array lens module calibration equipment according to claim 10, wherein the visual positioning module comprises a coaxial light source, a telecentric lens, and a visual positioning beam receiver, and the method of transmitting the visual positioning beam to the array lens module to obtain the appearance information comprises:

transmitting the visual positioning beam to the array lens module by the coaxial light source; and receiving the visual positioning beam from the array lens module to obtain the appearance information by the visual positioning beam receiver.

12. The calibration method of the array lens module calibration equipment according to claim 10, wherein the laser alignment module comprises an off-axis laser light source and a laser alignment beam receiver, and the method of transmitting the calibration laser beam to the array lens module to obtain the alignment information comprises:

transmitting the calibration laser beam to pass through the calibration via and the plurality of lens sets of the array lens module by the off-axis laser light source, wherein the calibration via is located at a symmetric center among the plurality of lens frames; and receiving the calibration laser beam from the array lens module by the laser alignment beam receiver.

13. The calibration method of the array lens module calibration equipment according to claim 10, wherein the depth-of-field measurement module comprises an array light source and a depth-of-field image capturing element, and comprising a method of transmitting a depth-of-field measurement beam to the array lens module to obtain the depth-of-field information comprises:

transmitting the depth-of-field measurement beam to pass through the plurality of lens sets of the array lens module by the array light source; and receiving the depth-of-field measurement beam from the array lens module to capture an image of the array lens module by the depth-of-field image capturing element.

14. The calibration method of the array lens module calibration equipment according to claim 10, wherein the coplanarity adjustment module comprises at least one robot arm, and the method of adjusting the relative positions of the plurality of lens frames and the substrate in the optical axis direction based on the appearance information, the alignment information, and the depth-of-field information comprises:

adjusting a relative rotation angle of each of the plurality of lens frames relative to the substrate based on the appearance information, the alignment information, and the depth-of-field information.

15. The calibration method of the array lens module calibration equipment according to claim 10, further comprising:

repeatedly transmitting the calibration laser beam to the array lens module to update the alignment information;

repeatedly transmitting a depth-of-field measurement beam to the array lens module to update the depth-of-field information; and adjusting the relative positions of the plurality of lens frames relative to the substrate in the optical axis direction based on the updated alignment information and the depth-of-field information.

* * * * *